June 18, 1963 R. STAEGER 3,093,982
DETACHABLE COUPLING FOR DRIVEN ACCESSORY IN KITCHEN APPLIANCES
Filed April 4, 1961
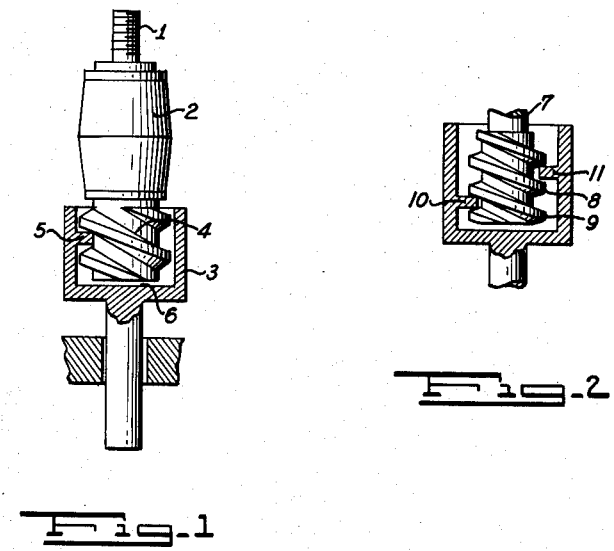
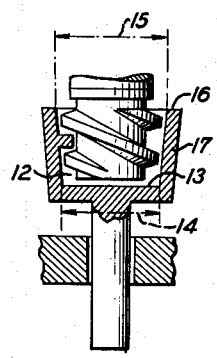
INVENTOR
RUDOLF STAEGER United States Patent Office 3,093,982
Patented June 18, 1963

3,093,982
DETACHABLE COUPLING FOR DRIVEN ACCESSORY IN KITCHEN APPLIANCES
Rudolf Staeger, Alsterdorferstrasse 155, Hamburg, Germany
Filed Apr. 4, 1961, Ser. No. 100,692
Claims priority, application Germany May 19, 1960
6 Claims. (Cl. 64—11)

This invention relates to power transfer apparatus and more particularly to a coupling between a driving member and an exchangeably detachable driven accessory device in electrically powered domestic appliances.

In most detachable accessory devices which can be exchangeably mounted on the drive shaft of an electrically driven appliance, particularly a domestic appliance, the accessory devices are usually coupled to the drive shaft by pushing the devices into a suitable socket or the like.

Such a coupling is deficient because it is possible to detach the accessory device while the appliance is in operation. There is also a risk that vibration may cause such an accessory device to loosen and become accidentally detached during operation, especially if the appliance is not positioned vertically.

In order to overcome these drawbacks the provision of various supplementary retaining means has been proposed, for instance in the form of one or more spring-loaded arresting studs, bayonet catches and so forth.

However, couplings with these retaining means are still deficient. It is an object of the present invention to provide a coupling which overcomes these drawbacks.

It is a particular object of the invention to provide a coupling between a drive shaft and an accessory device which will not be detachable during operation of the device.

To this end there is contemplated a coupling in which the driven shaft of the appliance is coupled with a drive shaft of an exchangeable accessory driven device such that during operation of the appliance the drive shaft will be subjected to an axial pull by the driven shaft.

According to the invention the drive shaft includes a socket which includes a chamber having an inner wall and a floor. At least one elongated projection extends from the inner wall. The driven shaft includes helical means at one end for fitting into the socket and for engaging the elongated projection. There is further provided a rigid shaft member at the other end of the driven shaft and an axially elastic means connecting the rigid shaft member to the helical means.

The invention will now be described by reference to the accompanying drawing wherein:

FIG. 1 shows, partly in section, an elevation view of a first embodiment of a coupling for power transfer to the present invention;

FIG. 2 shows in section a detail of the coupling according to a second embodiment, and FIG. 3 shows in section a detail of the coupling according to a third embodiment.

A driven shaft 1 is rigidly connected with and forms parts of the driven device. In order to effect power transfer the end of the driven shaft is divided, the two parts being connected together in axial alignment by a section of elastically yielding material 2 preferably chemically bonded to the two parts of the divided driven shaft. The end of the driven shaft, which is intended to be inserted into the socket 3 on the end of the drive or power take off shaft, is formed with one or more helical fins or threads 4 which cooperate inside the socket with one or more elongated projections 5 serving both as retaining means and a means for transmitting rotation from the power take off shaft to the driven shaft. In FIG. 1 a single projection 5 is shown for cooperating with a single helical thread 4, while in FIG. 2 two projections 10 and 11 are provided for cooperating with helical threads 8 and 9 supported on the end of shaft 7.

The depth of the socket in relation to the length of the helically finned end of the driven shaft is related such that when the accessory device has been fitted into the socket a small clearance gap 6 remains between the floor of the socket and the end of the driven shaft. The torque transmitted through the coupling when the appliance is in operation causes the end of the helically finned shaft, in virtue of its cooperation with the projections in the socket, to be drawn axially downwards further into the socket, the elastic member which connects the divided portion of the driven shaft yielding to the axial pull. The maximum inward displacement of the end of the driven shaft into the socket is limited by the available clearance gap above the floor of the socket. In FIGS. 1 and 2 the socket on the drive shaft is cylindrical to form a chamber of cylindrical shape. In FIG. 3 the socket 17 is divergent upwardly to form a chamber 12 in which the floor 13 has a smaller diameter 14 than the diameter 15 at the end 16 of the socket remote from the floor.

The clearance gap in the socket can be selected to permit the generation of a given axial force which force will be greater the wider the gap. Manual or accidental release of the accessory device is thereby rendered extremely difficult if not wholly impossible.

The helical fins or threads have the incidental effect of centering the driven shaft in the socket. Moreover, the axial rotation stabilizes the elastic connecting member.

The described coupling thus, on the one hand, serves for transmitting the torque and, on the other, in conjunction with the divided driven shaft and the elastic connecting member, it also provides a connection between the driven accessory and the driving motor, which is automatically safe while the appliance is in operation. When the motor is stopped and no torque is being transmitted the accessory device can be easily removed and replaced.

What is claimed is:

1. Power transfer apparatus comprising: a drive shaft, said drive shaft including a socket disposed at one end, said socket including a chamber with an inner wall and a floor, at least one elongated projection extending from said inner wall; and a driven shaft, said driven shaft including helical means at one end for fitting into said socket and engaging said elongated projection, a rigid shaft member at the other end of said driven shaft and an axially elastic means connecting said rigid shaft member to said helical means.

2. The apparatus of claim 1 wherein when said drive shaft is not driving said driven shaft there is an axial clearance between the end of said helical means and the floor of said chamber.

3. Apparatus according to claim 2 characterized in that said axially elastic means is of an elastic synthetic material which is chemically bonded to the shaft member and the helical means, and that the helical means for insertion into the socket of the drive shaft includes at least one helical fin.

4. Apparatus as claimed in claim 3 wherein said elongated projection engages said helical means and thereby retains the driven shaft while at the same time serving as means for transmitting torque between the shafts.

5. Apparatus as claimed in claim 4 wherein said chamber has a substantially circular section with a diameter near said floor less than the diameter at the end remote from said floor.

6. Apparatus as claimed in claim 3 wherein said helical means includes a plurality of fins, and said apparatus comprises a plurality of elongated projections engaging said fins of the helical means thereby retaining the driven shaft while at the same time serving as means for transmitting torque between the shafts.

References Cited in the file of this patent

UNITED STATES PATENTS

| | | |
|---|---|---|
| 976,232 | Tyson | Nov. 22, 1910 |
| 1,414,296 | Menten | Apr. 25, 1922 |
| 2,269,799 | Upson | Jan. 13, 1942 |
| 2,974,502 | Radcliffe | Mar. 14, 1961 |